United States Patent
Sridhar

(10) Patent No.: US 11,627,055 B2
(45) Date of Patent: Apr. 11, 2023

(54) SYSTEM AND METHOD FOR SUBSCRIBER TIER PLAN ADJUSTMENT IN A COMPUTER NETWORK

(71) Applicant: Sandvine Corporation, Waterloo (CA)

(72) Inventor: Kamakshi Sridhar, Plano, TX (US)

(73) Assignee: SANDVINE CORPORATION, Waterloo (CA)

( * ) Notice: Subject to any disclaimer, the term of this patent is extended or adjusted under 35 U.S.C. 154(b) by 0 days.

(21) Appl. No.: 17/115,038

(22) Filed: Dec. 8, 2020

(65) Prior Publication Data
US 2021/0328885 A1    Oct. 21, 2021

Related U.S. Application Data

(60) Provisional application No. 63/011,418, filed on Apr. 17, 2020.

(51) Int. Cl.
*H04L 41/5009* (2022.01)
*H04L 43/55* (2022.01)

(52) U.S. Cl.
CPC .......... *H04L 41/5009* (2013.01); *H04L 43/55* (2022.05)

(58) Field of Classification Search
CPC .. H04L 41/5009; H04L 41/5038; H04L 12/24
USPC ....................................................... 709/220
See application file for complete search history.

(56) References Cited

U.S. PATENT DOCUMENTS

| | | | |
|---|---|---|---|
| 9,325,597 B1 * | 4/2016 | Clasen | H04L 47/762 |
| 2004/0071086 A1 * | 4/2004 | Haumont | H04Q 3/0091 |
| | | | 370/328 |
| 2010/0183132 A1 | 7/2010 | Satyavolu et al. | |
| 2012/0155296 A1 | 6/2012 | Kashanian | |
| 2012/0275377 A1 * | 11/2012 | Lehane | H04L 41/0816 |
| | | | 370/328 |
| 2015/0079929 A1 * | 3/2015 | McNamee | H04L 12/1407 |
| | | | 455/406 |
| 2015/0373206 A1 * | 12/2015 | Mohammed | H04W 4/24 |
| | | | 455/406 |

(Continued)

OTHER PUBLICATIONS

European Patent Office, European Search Report for Corresponding EP Pat. App No. 20213126.4, dated Jun. 11, 2021.

*Primary Examiner* — Brian Whipple
(74) *Attorney, Agent, or Firm* — Amarok IP Inc.; Neil W. Henderson

(57) ABSTRACT

A method for subscriber tier plan adjustment including: monitoring traffic flow for one or more subscriber of a plurality of subscribers on an operator's network; determining a bandwidth requirement for each of the one or more subscribers; determining a recommended tier plan for each subscriber based on the subscribers' bandwidth requirement; and providing the recommended tier plan for each of the subscribers to a network operator. A system for subscriber tier plan adjustment including: a learning module configured to monitor traffic flow for one or more subscribers of a plurality of subscribers on a network and determine a bandwidth requirement of each of the one or more subscribers; an analysis module configured to determine a recommended tier plan for each of the subscribers based on each subscriber's bandwidth requirement; and a notification module configured to provide the recommended tier plan for each subscriber.

13 Claims, 8 Drawing Sheets

(56) References Cited

U.S. PATENT DOCUMENTS

2017/0230293 A1\* 8/2017 Meredith ................ H04L 43/16
2019/0372857 A1\* 12/2019 Gandhi ................... H04L 41/12

\* cited by examiner

| | Day 1 | Day 2 | Day 3 | Day 4 | Day 5 | Day 6 | Day 11 | Final Value |
|---|---|---|---|---|---|---|---|---|
| Sub 1 | 14 Mbps | 11 Mbps | 18 Mbps | 6 Mbps | 24 Mbps | 3 Mbps | 14 Mbps | 4 Mbps | 24 Mbps |
| Sub 2 | 41 Mbps | 32 Mbps | 27 Mbps | 49 Mbps | 48 Mbps | 3 Mbps | 18 Mbps | 22 Mbps | 49 Mbps |
| Sub 3 | | | | | | | | | 4 Mbps |
| : | | | | | | | | | 48 Mbps |
| Sub 21 | | | | | | | | | 23 Mbps |

Fig. 8

| Highest Value | # subs that send traffic for that highest value | Candidate Tier Plan |
|---|---|---|
| 24 Mbps | 4 | No |
| 4.8 Mbps | 9 | Yes |
| 6 Mbps | 2 | No |
| 48 Mbps | 10 | Yes |

SYSTEM AND METHOD FOR SUBSCRIBER TIER PLAN ADJUSTMENT IN A COMPUTER NETWORK

RELATED APPLICATIONS

This patent application claims priority form U.S. Provisional Patent Application No. 63/011,418 filed on Apr. 17, 2020, which is hereby incorporated herein in its entirety.

FIELD

The present disclosure relates generally to computer network traffic and control thereof. More particularly, the present disclosure relates to a system and method for subscriber tier plan adjustment within a computer network.

BACKGROUND

Network traffic continues to increase all over the world. As network traffic increases, service providers and network operators try to optimize the use of their network in order to maximize customer satisfaction and throughput of the network. Network operators often have varying levels of access to their networks. These access levels are often referred to as tier plans for their subscribers. The varying tiers may be provided to subscribers at different price points, with the higher cost tiers generally providing for more bandwidth per subscriber than the lower cost tiers.

Service providers try to provide a certain level of Quality of Experience (QoE) per subscriber to avoid subscriber churn (that is, subscriber leaving to another service provider or jumping around among service providers). If a subscriber is having issues and not receiving a particular level of QoE, the subscriber is more likely to churn and search for a different service provider or network operator. Churn can be costly to service providers and, as such, service providers try and avoid and reduce churn, where possible.

It is, therefore, desirable to provide an improved method and system for subscriber tier plan adjustment that can provide improved or optimized assignment of tiers and/or subscribers in tiers.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for subscriber tier plan adjustment, the method including: monitoring traffic flow for one or more subscriber of a plurality of subscribers on an operator's computer network; determining a bandwidth requirement for each of the one or more subscribers; determining a recommended tier plan for each of the one or more subscribers based on the one or more subscribers' bandwidth requirement; and providing the recommended tier plan for each of the one or more subscribers to a network operator.

In some cases, the bandwidth requirement may be determined by monitoring both uplink and downlink traffic flow.

In some cases, determining a recommended tier plan for each of the one or more subscribers may include: determining a highest throughput for each of the one or more subscribers over a predetermined time interval; and determining a recommended tier plan based on the highest throughputs for each of the one or more subscribers.

In some case, the method may further include developing a set of recommended tier plans, wherein for a tier plan to be included within the set of recommended tier plans, the number of subscribers that send traffic up to a highest value must exceed a predefined subscriber number threshold.

In some cases, determining the recommended tier plan for each of the one or more subscribers may include determining whether the subscriber is self-congested in the subscribers current tier plan.

In some cases, a subscriber may be self-congested if the subscriber reaches a maximum throughput limit a higher number than a predetermined self-congestion threshold of a period of time.

In some cases, a subscriber may be self-congested if a QoE metric associated with the subscriber degrades significantly more than a predetermined percentage for a predetermined period of time.

In some cases, the method may further include, automatically notifying at least one of the one or more subscribers of the recommended tier plan and allowing the at least one of the one or more subscribers to automatically upgrade their tier plan.

In another aspect, there is provided a system for subscriber tier plan adjustment, the system including: a learning module configured to monitor traffic flow for one or more subscribers of a plurality of subscribers on a computer network and determine a bandwidth requirement of each of the one or more subscribers; an analysis module configured to determine a recommended tier plan for each of the one or more subscribers based on each subscriber's bandwidth requirement; and a notification module configured to provide the recommended tier plan for each subscriber to a network operator.

In some cases, the bandwidth requirement may be determined by monitoring both uplink and downlink traffic flow.

In some cases, the analysis module may be configured to: determine a highest throughput for each of the one or more subscribers over a predetermined time interval; and determine a recommended tier plan based on the highest throughputs of the one or more subscribers.

In some cases, the analysis module may be further configured to develop a set of recommended tier plans, wherein for a tier plan to be included within the set of recommended tier plans, the number of subscribers that send traffic up to a highest value must exceed a predefined subscriber threshold.

In some cases, the analysis module may be further configured to determine whether the subscriber is self-congested in the subscribers current tier plan.

In some cases, a subscriber may be self-congested if the subscriber reaches a maximum throughput limit a higher number than a predetermined self-congestion threshold of a period of time.

In some cases, a subscriber may be self-congested if a QoE metric associated with the subscriber degrades significantly more than a predetermined percentage for a predetermined period of time.

In some cases, the notification module may be further configured to automatically notify at least one of the one or more subscribers of the recommended tier plan and allow the at least one of the one or more subscribers to automatically upgrade their tier plan.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 8 is a table showing throughput reached per subscriber for a specific example;

DETAILED DESCRIPTION

Generally, the present disclosure provides a method and system for subscriber tier plan adjustment/improvement/optimization. Embodiments of the system and method are configured to determine various tier plans offered by the network operator. The system and method are configured to monitor each of a plurality of subscriber's use of the network. In reviewing the use, the system and network are configured to determine a desirable amount of throughput, uplink and downlink capacity each subscriber would benefit from for an appropriate Quality of Experience (QoE). On determining the appropriate tier, the subscribers may be notified of an appropriate upgrade or may be provided with data concerning the subscriber's network use. In some cases, embodiments of the system and method may be configured to provide for traffic actions based on the determined tier for the subscriber.

In reviewing QoE measurements of subscribers in networks (such as Fixed Wireless Access networks) with inline shaping mechanisms, it was determined that there were some cells that had plenty of radio capacity to support a large number of subscribers and yet in those same cells, the QoE metrics indicated that at least some of the subscribers had poor QoE. It was noticed that there were subscribers who were not able to send or receive more than a certain amount of traffic. It was determined that the reasons for poor QoE may not necessarily be tied to radio capacity and further exploration was conducted on other mechanisms in play that might be causing the QoE to be poor. It was determined that one reason the subscribers may have poor QoE included the subscriber's existing Tier plan.

The availability of a variety of streaming video applications, gaming applications, and other application on increasingly bigger screen devices has led to increased bandwidth consumption by subscribers. Subscribers and users are consuming a rich variety of applications and continue to expect a high Quality of Experience (QoE) even with the growing consumption. With growing traffic demand, operators continue to upgrade their networks periodically to support the high expectations for subscriber QoE while offering a variety of Tier plans priced at different price points to help pay for and finance the network build. Tier plans allow operators to deliver an appropriate QoE to an end subscriber based on the price that the end subscriber is willing to pay. In the below example, the impact of Tier plans on the QoE in Fixed Access Networks is reviewed. It will be understood that embodiments of the system and method are intended to be operable with various types of networks, including, for example, Fixed Wireless Access, DSL, Cable, Fiber-To-The-Home, Satellite networks and the like.

Figure 1:
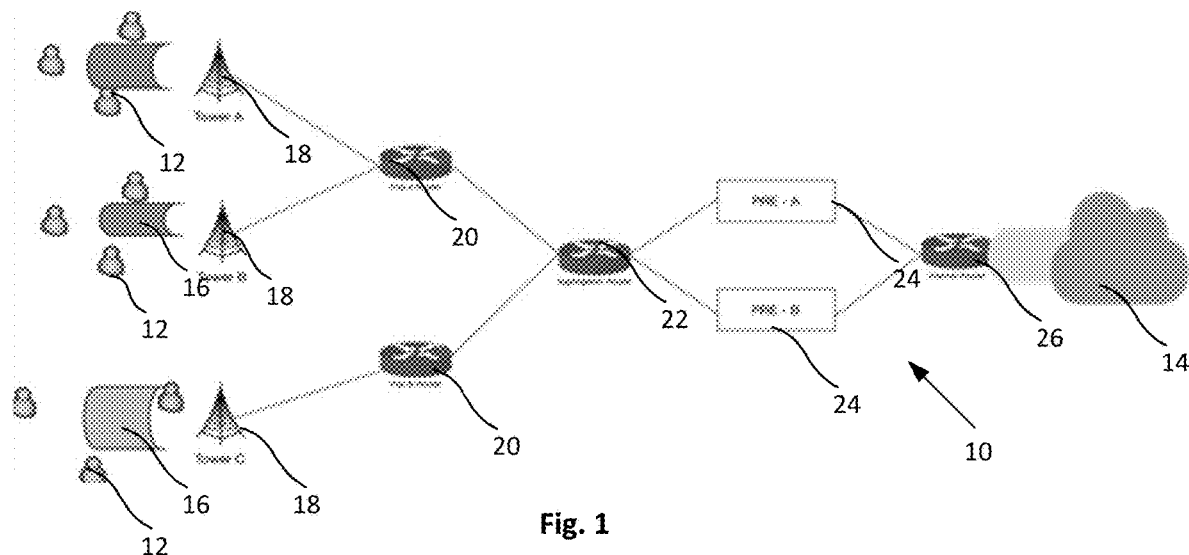
FIG. 1 illustrates a fixed wireless access network as an environment for embodiments herein.

FIG. 1 shows a diagram of a network 10 with Fixed Wireless Access links and an inline shaper. Subscribers 12 connect to the Internet 14 via a fixed wireless link 16. Each link 16 may be associated with a fixed wireless tower 18. The towers may transmit the network traffic to routers 20 which may further transmit the traffic to an aggregation router 22. The aggregation router may transmit the traffic through shapers 24 prior to the traffic being transmitted to an internet router 26 than to the destination via the Internet 14. It will be understood that the traffic travelling from the Internet to a subscriber would generally be transmitted in an opposite order of operations to reach the subscriber 12. Although FIG. 1 illustrates a fixed access network, it will be understood that the system and method may be used by various types of networks which offer a variety of Tier plan subscriptions to their users/subscribers. These networks may include fixed networks such as DSL networks, ADSL networks, VDSL networks, FTTX networks, Cable networks, Satellite networks.

Figure 2:
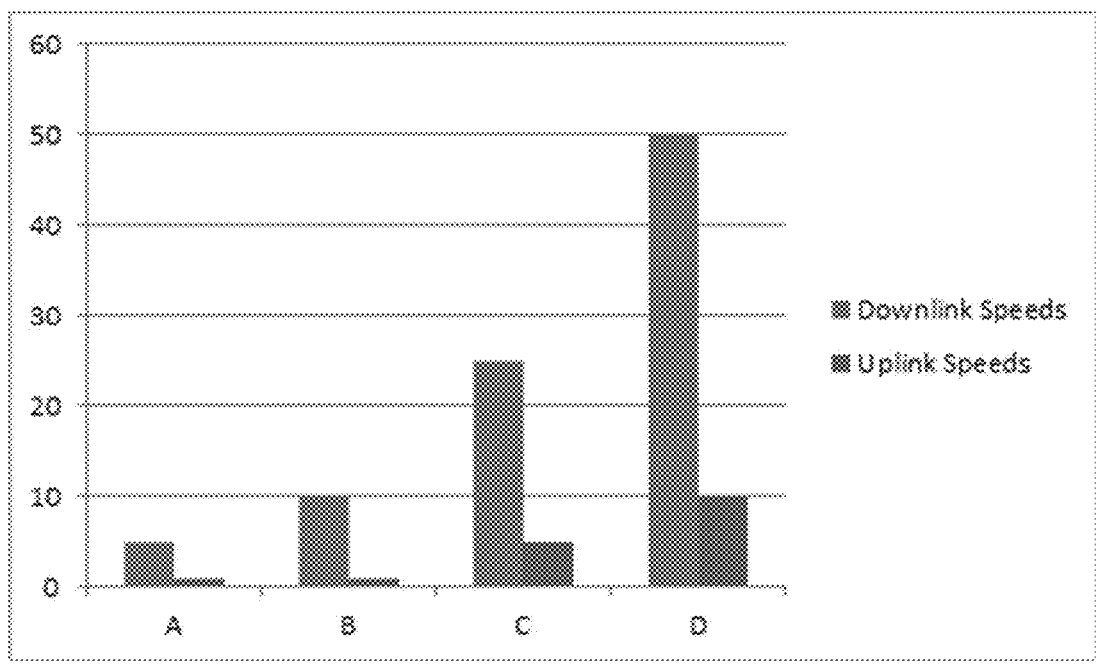
FIG. 2 illustrates an example of downlink and uplink speeds for a subscriber tier plan.

In one non-limiting example, and as shown in FIG. 2, a network may offer four different tier plans, providing the subscriber's with 4 different level of network access. In this example, the plans may be as follows:
  i. Tier plan A—5 Mbps downlink, 1 Mbps uplink—the lowest cost tier plan at $20/month
  ii. Tier plan B—10 Mbps downlink, 1 Mbps uplink at $30/month
  iii. Tier plan C—25 Mbps downlink, 5 Mbps uplink at 50/month
  iv. Tier plan D—50 Mbps downlink, 10 Mbps uplink, the highest cost tier plan at $100/month Different operators may have more or less tier plans, with different access levels and may further be priced differently. It will also be noted that network operator may offer seasonal discounts, promotional offers or other specials that may change the tier plans. Further, various countries will likely have different tier plans, priced competitively for that market. The principle described in this disclosure is intended to apply to any combination of tier plans.

As a result of a subscriber reaching their Tier plan limits, in a conventional system, the network provider may automatically cap the bandwidth for that subscriber according to their downlink or uplink plan limit or begin billing the subscriber at a higher rate for the additional bandwidth usage. As subscribers consume bandwidth with applications such as gaming or video streaming, the subscriber may quickly reach their bandwidth limit, specified in their current tier plan. In some cases, once those bandwidth limits are reached, bandwidth to the subscriber may be shaped, via, for example, the shapers 24, in the network.

Hoping to obtain a high QoE, a subscriber who consumes significant data, would generally purchase the best (highest)

Tier plan 4, which offers the highest downlink and uplink speeds. However, since the best tier plan may be relatively expensive, a subscriber often chooses to purchase a lower Tier plan, for example, Tier plan 2, depending on the subscriber's budget. Conversely, a subscriber who consumes little data would generally not see any QoE benefit by moving to a higher Tier plan and therefore not necessarily benefit from a higher Tier plan (or a more costly Tier plan).

So there is often a tradeoff between QoE and the cost of the Tier plan. Higher Tier plans tend to provide the subscriber with higher QoE, but are also more expensive. Higher tier plans are likely to result in higher QoE if a subscriber is indeed consuming bandwidth hungry applications.

In addition to the lower Tier plans likely providing lower bandwidth availability, subscribers may also experience poor QoE issues due to a variety of other reasons. Subscribers may be situated far away from their WiFi Access Point router insider their home. Poor placement of WiFi routers within their home is conventionally a cause of poor subscriber QoE. A plurality of users within the home may also be simultaneously invoking high bandwidth applications that result in WiFi downlink congestion or even WiFi uplink congestion.

While these problems can affect the subscriber's QoE, the subscriber may also be experiencing poor QoE issues due to having a subscription in low bandwidth Tier plans. When a subscriber makes a call into the customer care center, the customer care agent may take considerable time trying to troubleshoot the issue of poor QoE only to discover that the QoE was due to a Tier plan limit being reached. In some cases, it may be that the subscriber has not upgraded their Tier plan over the years, even though they are consuming increasingly higher bandwidth applications.

It is important to be able to distinguish between a variety of root causes (for example, a home WiFi router issue, a mismatch of Tier plan, or the like) to help the customer care agent take appropriate action.

Embodiments herein are intended to provide a system and method that allow a network operator to detect when a subscriber is hitting the Tier plan limit and recommend or set the best Tier plan for a subscriber to maximize the QoE for the applications they are consuming, at the lowest cost to the subscriber.

Figure 3:
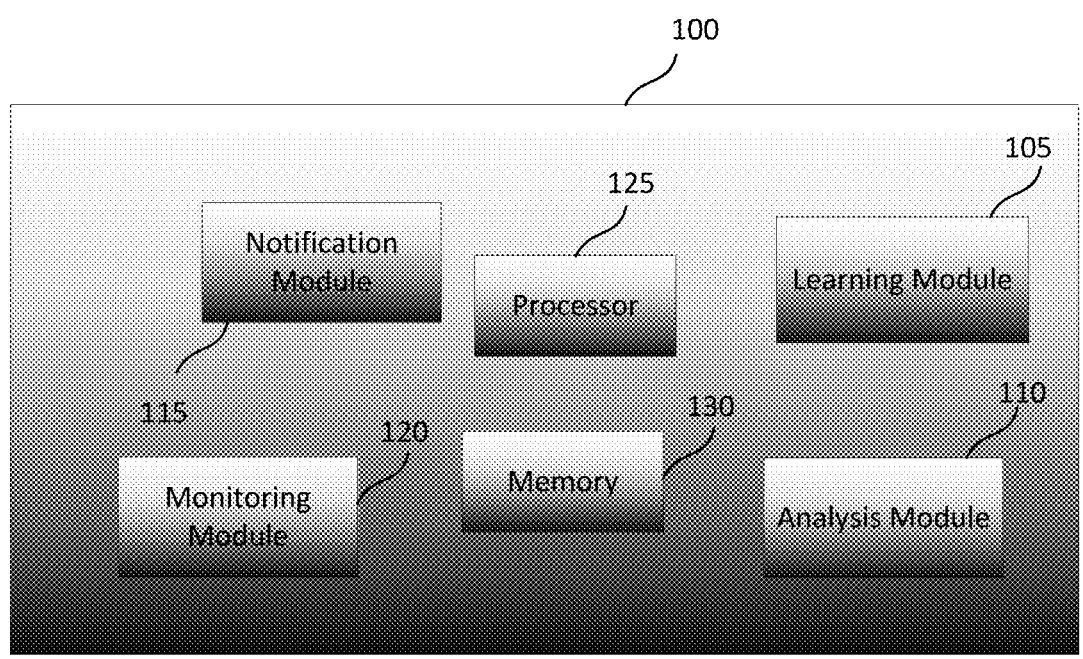
FIG. 3 illustrates a system for subscriber tier plan adjustment according to an embodiment.

FIG. 3 illustrates a system 100 for subscriber tier plan adjustment according to an example embodiment. The system 100 includes a learning module 105, an analysis module 110, a notification module 115, a monitoring module 120, a processor 125 and at least one memory component 130. The system 100 is intended to reside on the core service provider network but, may be remote or access remote resources, while having a connection to the core network. The modules, including the processor 125 and memory 130, are in communication with each other but may be distributed over various network devices or may be housed within a single network device. The system 100 is intended to review the traffic flow within the network to allow the system 100 to determine traffic flow criteria, for example, uplink bandwidth usage, downlink bandwidth usage, application type, and the like. In some cases, the traffic flow is monitored by deep packet inspection or the like in order to obtain the information needed without increasing the traffic on the network due to information gathering queries or the like being required. The system may receive the traffic flow being either being inline, or having a tap or a port mirror the traffic passively to a database collection entity.

The learning module 105 is configured to review the traffic flow of at least one subscriber of a plurality of subscribers for at least an initial set up period. It is intended that the learning module 105 may review the traffic flow as well as the bandwidth consumption of the plurality of subscribers to determine at least a rough framework for the network operator's tier plan. The learning module 105 is also configured to further review the traffic flow of at least a subscriber of interest. In some cases, the learning module may gather data to determine the traffic flow and bandwidth consumption and bandwidth requirements and may further determine the application mix used by the at least one subscriber.

The analysis module 110 is configured to aggregate the traffic flow data received or retrieved from the learning module 105. The analysis module 110 may further determine the bandwidth consumption of at least one subscriber of interest. From the bandwidth consumption, the analysis module may determine a bandwidth requirement for the at least one subscriber. In some cases, the analysis module 110 may provide for an uplink consumption estimate as well as a downlink consumption estimate for the subscriber.

The notification module 115 is configured to use bandwidth consumption and bandwidth requirements provided by the analysis module 110 in order to help determine an appropriate or recommended tier plan for the subscriber. In some cases, the notification module 115 is configured to notify the subscriber and/or the network operator of a subscriber that is hitting or exceeding their tier plan and would benefit from an upgraded tier plan. In some cases, the notification module 115 may be configured to provide traffic actions for a subscriber. For example, an optional traffic action such as shaping could be performed either leading up to or after hitting the uplink/downlink bandwidth limit. In particular, a user might have their bandwidth limited or shaped to provide lower QoE (for example, slower loading of video or the like) in order to conserve some bandwidth within the limit. Alternatively, a user might have their bandwidth shaped to have better/higher QoE as an indicator of what they might expect at the higher Tier, somewhat like a "free-trial period" to encourage the user to move to the higher Tier. It will be understood that various other types of traffic actions may also or alternatively be taken, including taking action at an application rather than user level.

The monitoring module 120 is configured to monitor the traffic flow of the subscriber after the appropriate tier has been determined. The monitoring module 120 is configured to monitor the bandwidth consumption of the subscriber to determine whether any changes regarding the subscriber's bandwidth consumption has been determined. If the subscriber's bandwidth consumption changes, it may be assumed that the subscriber's bandwidth requirements have also changed. This type of monitoring allows for on-going updating of the subscriber/user and/or on-going adjustment of the traffic actions noted above.

Figure 4:
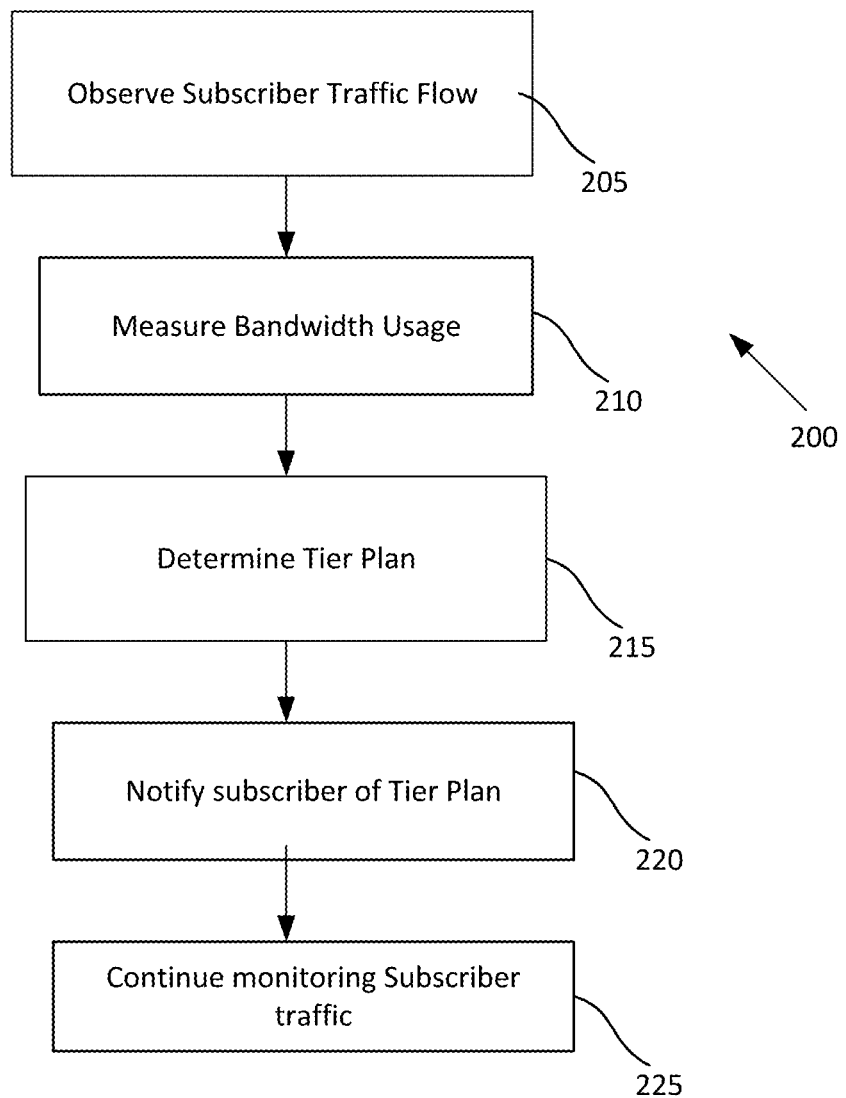
FIG. 4 illustrates a method for subscriber tier plan adjustment according to an embodiment.
Figure 5:
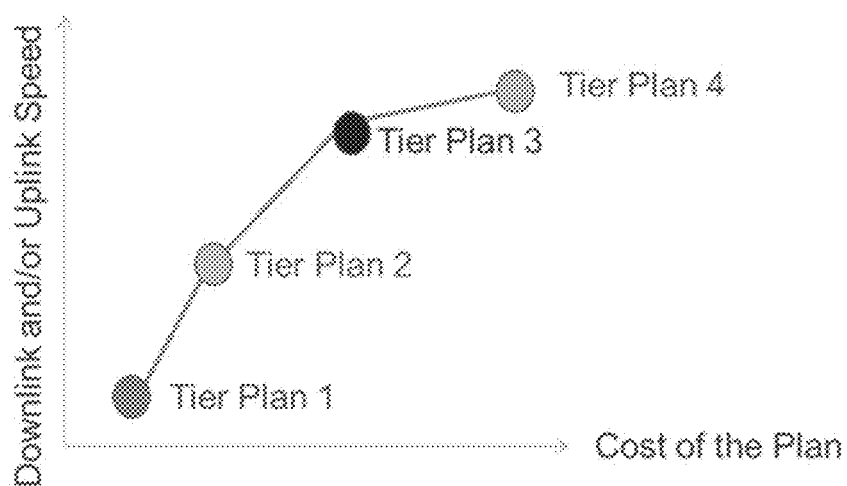
FIG. 5 is a graph illustrating a qualitative tradeoff between downlink and uplink tier plans.

FIG. 4 illustrates an embodiment of a method 200 for adjusting a subscriber tier plan in a computer network. At 205, the learning module 105, is configured to monitor the traffic flow of each of a plurality of subscribers and provide the data to the analysis module 110. At 210, the analysis module 110 determines the subscriber's bandwidth requirements based on the subscriber's bandwidth consumption. The analysis module may review both uplink and downlink use of the subscriber.

At 215, the notification module 115 is configured to determine the appropriate tier plan based on the subscriber's usage. At 220, the notification module 115 is configured to notify the subscriber if it is determined the subscriber would benefit by upgrading into a higher Tier plan. At 225, the monitoring module 120 continues to monitor the bandwidth consumption of the subscriber to determine whether the subscriber remains in an appropriate tier plan for the subscriber's usage. It will be understood that the method may run continuously and many aspects of the method may be performed simultaneously as further detailed herein.

A subscriber may have bought a 'lower cost' Tier plan to fit his budget when he subscribed, but now has begun to watch high definition movies or the like. Since the subscriber is on a lower cost Tier plan, the subscriber may be unable to either send or receive traffic because the operator may be shaping the traffic in the core network once the subscriber has exceeded their allowable Tier plan (bit rate) plan. As a result, the subscriber will experience poor QoE even though there may be very few subscribers currently using the network and plenty of available network capacity. A subscriber who has reached their limit of the traffic plan will be shaped and, as a result, the maximum bandwidth the subscriber can send is limited to their allowable Tier plan rate. Such a subscriber is referred to as a self-congested subscriber. Self-congestion could also be in the uplink due to a subscriber sending a lot of background traffic, from, for example, a door bell or security camera, or the like, in the uplink, alone or in combination with other traffic such as video uploads and the like.

When subscribers call in with a poor QoE issue, operators or customer call centers have very little insight into the QoE issues inside the home. Hence the network operator will often send a technician which may be an unnecessary expense to the operator. In some cases, the problem may be due to a subscriber hitting their Tier plan resulting in self-congestion. Other congestion management mechanisms that will shape other subscribers traffic will likely to be ineffective because allocation of bandwidth to a given subscriber will be capped by their own Tier plans rather than due to the lack of availability of capacity in the network.

Embodiments of the system and method provided herein are intended to give the operator the ability to identify if the subscriber is having a poor QoE due to self-congestion rather than assume that the subscriber has a network problem such as a cable modem, access link congestion, poor WiFi placement, or the like, or another issue due to, for example, other subscribers in the network who are contending for the network resources.

The method detailed herein is intended to enable an operator to receive an automated view of which subscribers are self-congested, the degree to which they are experiencing self-congestion and whether they are self-congested in the uplink or in the downlink. Subscribers can be flagged, tagged, or otherwise noted, when their self-congestion hits a limit or a predetermined threshold for a period of time, for example, a day. With this information, the operator may be able to automatically upsell tier plans to subscribers who would benefit from the higher bandwidth. With more targeted upselling, it is intended that the network operator will not try to upsell very expensive Tier plans that would not be needed for a particular subscriber. In still other cases, the network operator may be given the information that allows subscribers to downgrade their tier plan if the subscriber is not reaching any of the current Tier plan limits.

Conventionally, there does not appear to be any automated systems or methods to identify if subscribers are self-congested. As a result, when a subscriber calls in to the customer care center with an issue, the operator does not have the detailed, real-time and accurate information needed to diagnose the reasons for poor QoE. Sometimes information may be available to the customer care agent after examining detailed logs, which are not able to be delivered in real-time and are conventionally coarse in granularity. Therefore the actions that are taken by the customer care agent or the network operator are often not responsive enough to address the QoE needs of the subscriber.

It will be understood that the best choice of tier plan is one that results in the highest QoE to the subscriber at the lowest possible cost. This tradeoff is qualitatively illustrated in FIG. 4. Usually higher downlink or uplink speeds in either direction will be associated with more expensive Tier plans. The scale may not be linear between Tier plans but the trend is intended to be true.

Embodiments of the system and method herein are intended to learn the Tier plans offered by the operator in an automated way without any additional input, in near-real-time. Further, embodiments of the system and method are intended to determine which subscribers are not in the correct tier and/or self-congested and the degree to which they are self-congested. This determination is intended to trigger an appropriate upgrade/increase in Tier plan limits for that subscriber in a targeted way to help improve QoE for that subscriber. In some cases, the customer may be automatically provided with the information and a suggested upgrade.

Embodiments of the system and method detailed herein are intended to monitor at least a subset of subscribers of the plurality of subscribers of the network operator and learn and see how close each subscriber is to plan limits by measuring how many times within a predetermined period, such as a day, each subscriber hits within a predetermined threshold of the Tier plan limits. In some cases, the predetermined threshold may be in the range of, for example, 85 to 99%, while in other cases the predetermined threshold may be configurable by the network operator. In a specific example, the predetermined threshold may be 95%.

If a subscriber reaches the predetermined threshold more than a certain number of times within a day (In a specific example, the number may be more than 10% of the day). It will be understood that this number can be configured by the network operator or may be set as a predetermined default value. If this number is reached, then such a subscriber is declared to be self-congested. As the subscriber is not able to send or receive more traffic than is allowed by their tier plan, even though there may be plenty of available bandwidth, the subscriber would become self-congested when the predetermined threshold is met. Such a subscriber may experience poor QoE and may call in to the operator.

If a subscriber is hitting the Tier plan limits consistently (for example, more than the 10% a day or other threshold), the notification module may suggest to the subscriber to upgrade to the next higher Tier plan to the subscriber. Alternatively, if a subscriber is hitting the Tier Plan limits and if their QoE has also degraded, then the notification module may suggest the subscriber upgrade to the next higher Tier plan to the subscriber. It will be understood that there may be other metrics used to determine when a user should be notified that an upgrade would be recommended.

The decision on when to upgrade the user to a higher tier plan may depend on observation of QoE degradation. If the QoE degrades, even when the Tier plan is hit for only 2% of the day, then the Tier plan may benefit from being upgraded. Conversely, if the QoE does not degrade even if the Tier plan is breached, for example for 89% of the day, then the Tier plan may not benefit from the upgrade. If the QoE does not degrade even though the Tier plan is not breached, then no upgrade decision is needed. In other words, the upgrading of the Tier plan for the subscriber may be based on the observation of QoE degradation.

Figure 6:
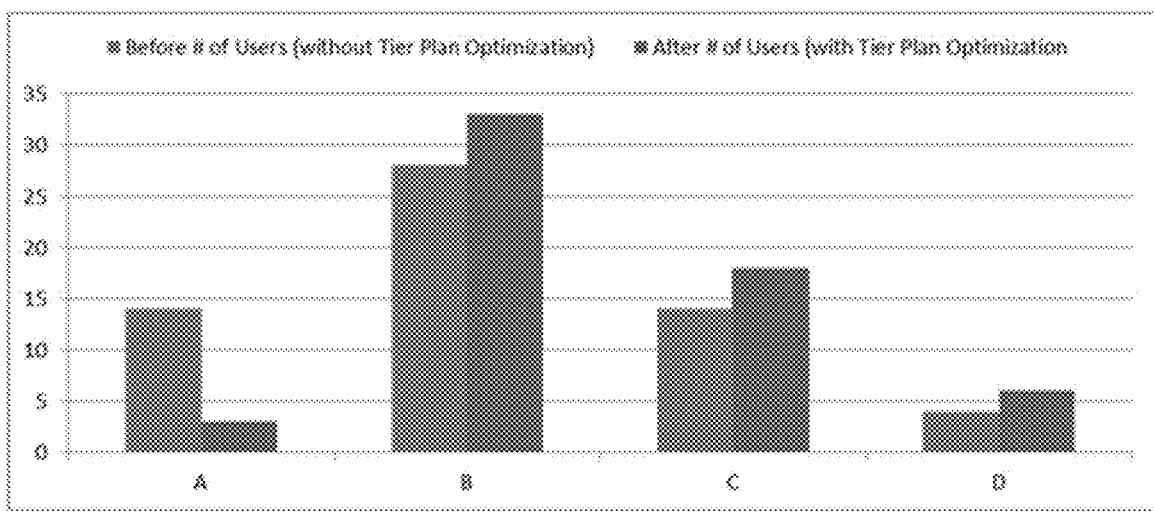
FIG. 6 illustrates a before and after graph of subscriber distribution across tier plan according to a specific example.

Once the Tier plan is upgraded, the method may iteratively continue system may continue to monitor if further upgrades to the tier plan may be beneficial to help meet the QoE for the given subscriber. FIG. 6 provides an example graph of the distribution of subscribers with and without using the system and method for tier plan optimization.

By continuously monitoring, the system and method detailed herein are intended to determine whether the subscriber is be in the right Tier plan that may be considered the most optimal for their QoE and that is also budget appropriate for the subscriber. Users in lower Tier plans may be appropriately upsold higher tier plans, when it is noted that they require further bandwidth.

Embodiments of the system and method are intended to provide improvement in QoE for those subscribers whose tier plans are upgraded as detailed herein. In particular, embodiments of the system and method are intended to provide an appropriate tradeoff between cost and QoE for the end subscriber.

Embodiments of the method and system are intended to adapt based on reviewing the traffic sent and received by each of a plurality of subscribers and can accommodate a variety of tier plans and/or changes in tier plans, in near-real-time. Further, embodiments of the system and method are intended to be agnostic to the access technology because, for example, some embodiments can be fully based on the network and rely on data packets for the information needed to conduct the analysis. The system and method are intended to be agnostic to access technology as the system and method are intended to use users QoE degradation. The QoE degradation could be due to subscribers reaching their Tier plan limit. Within this scope, the physical and MAC layer mechanisms that allow for packets to be delivered to the end user will only have an impact on the QoE metrics. Other factors that impact QoE metrics but are unrelated to Tier plans are outside the scope.

It is intended that embodiments of the system and method would adapt quickly to changes in number of subscribers within a tier plan. Further, as the system and method are intended to be targeted and it is intended reduce the offers of unnecessary upgrades that would not be worthwhile to the subscriber. An advantage of the method and system is that it is intended to help meet the desired QoE for the subscriber while keeping the offering competitive.

The method for adjusting/improving/optimizing subscriber tier plans is intended to automatically detect subscriber tier plans and decide the appropriate tier plan for improving or optimizing the subscriber QoE. In this disclosure, the terms 'user and 'subscriber' are used interchangeably and mean the same. It will be understood that similar data can be reviewed and the system configured to recommend different/improved tier plans to an operator.

Figure 7:
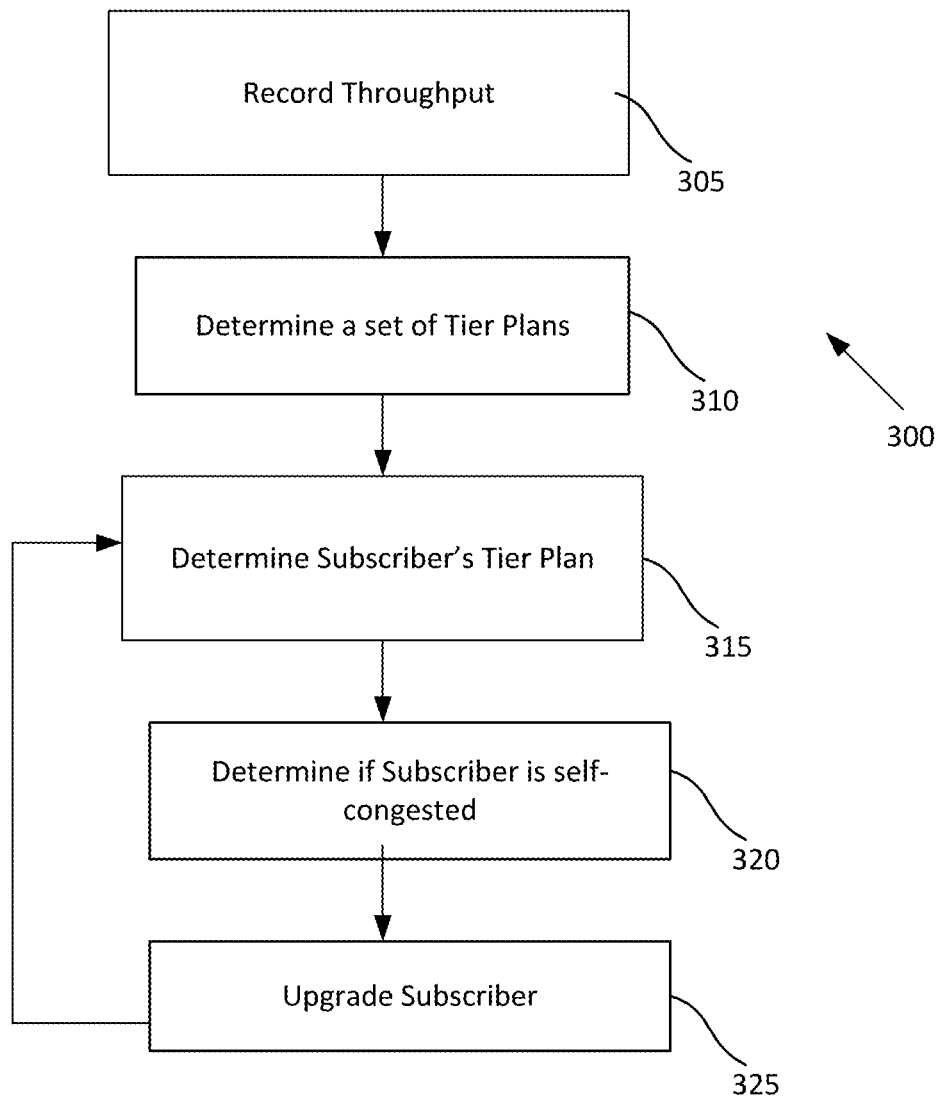
FIG. 7 illustrates a method for subscriber tier plan optimization according to another embodiment.

FIG. 7 illustrates a method 300 for subscriber tier plan adjustment according to an embodiment. At 305, throughput is recorded. The learning module 105 is configured to determine and record the highest throughput for each subscriber to learn the various tier plans offered by the network operator. The learning module 105 may store the recorded throughput in the memory component. The learning module is configured to determine various tier plans though auto discovery and in particular, by observing the traffic sent by various subscribers within the network.

The learning module is configured to determine, for at least one subscriber of a plurality of subscribers, each day, the highest value recorded throughput for that day. In a specific example, the system may determine at 11 PM each day at the previous 24 hours and look at say 4 min*14*24=1440 samples to determine the highest throughput sent by each subscriber of the network operator's subscribers.

Alternatively, each day, per subscriber, each hour the system may record the highest value and then roll up. So if from 3-4 pm, highest throughput was 57 Mbps and then from 5 to 6 PM the highest throughput was 81 Mbps, the system may be configured to record the 81 Mbps and discard the 57 Mbps. The decision of which option to pick may be configurable based on operator preference.

At the end of each day, the system determines and stores the highest throughput consumed per subscriber. FIG. 8 is a table which shows the outcomes of the highest throughput reached per subscriber after 14 days of learning. It will be understood that 14 days is a specific example and the learning period may be more or less days as configured by the system or by the network operator. It will be understood that the desire of the learning module is to include sufficient examples to determine the most likely highest throughput rate. The highest value sent by each subscriber is recorded as a candidate tier plan.

Returning to FIG. 7, at 310, the learning module is configured to determine a set of subscriber tier plans. For a plan to be declared as a tier plan, the number of subscriber that send traffic up to a certain highest value must exceed a predefined subscriber threshold. The predefined subscriber threshold is intended to indicate the confidence that a particular plan can be declared as a tier plan.

The learning module may define a parameter C that is the number of subscribers with a predetermined peak value. In other words, C can be considered the number of instances that a predetermined throughput limit is being reached. For example if there are say 8 subs reaching the highest downlink throughput (or uplink throughput) of say 24 Mbps, then C is 8. The predetermined peak value or predetermined throughput limit may be a value or a range or the like.

The choice of throughput limit and peak value may be a heuristic, iterative process. An initial value may be picked that is a likely Tier plan value in that network, for example, 10 Mbps or 100 Mbps. A priori knowledge of Tier plan values may be helpful, but not required.

After the learning period is completed, which in this example has been set as 14 days, the system determines when C>Threshold, then the throughput is declared as a 'candidate tier plan'. This threshold may be the number of subscribers, and is chosen to be 6 in this example. It will be understood that the learning period and number of subscribers can vary per network operator.

This reflects the fact that the algorithm wants to observe sufficient number of subscribers hitting a certain maximum throughput value for that maximum throughput value to be declared as a Tier Plan.

Figures 9, 10:
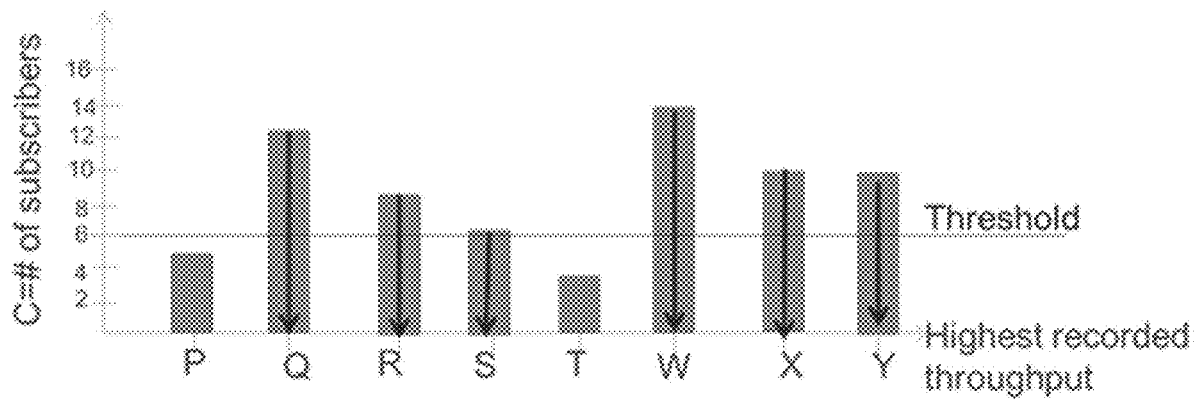
FIG. 9 illustrate a graph showing throughput value as a tier plan.
FIG. 10 is a table showing a tier plan with threshold according to an example.

FIG. 9 shows an illustration for declaring a throughput limit as corresponding to a tier plan. The X axis is the maximum throughput sent by a subscriber and the Y axis shows the number of subscribers that send a certain maximum throughput. For example, there may be 13 subscribers who send a throughput of no higher than Q Mbps. The method described herein can apply to either or both downlink and uplink traffic.

FIG. 10 shows a table of the example with the Threshold=6 subscribers. A higher or lower threshold can be set with a longer or shorter learning period. After the learning period, a set of tier plans are identified. After some time the set of Q, R, S, W, X will stabilize. At this time, the learning period can be stopped. In some cases, the method and system may continue the learning period in the background in order to identify changes, upgrades or new tier plans by the network operator.

From the learning module after the learning phase, the outcome is a set of candidate tier plans Q, R, S, W, X, Y identified. Over time the set of candidate tier plans may grow to include P, T or any number of tier plans subject to the requirements of the operator. Alternatively, tier plans P, T or the like may be prepopulated as potential tier plans but values ascribed to P and T may not correspond to any specific tier plan of the operator.

The set of subscribers used to decide a tier plan may be set by the operator and may be small or large. For example, an operator may want to have a minimum number of subscribers before setting a tier plan and/or may want to have a maximum number of subscribers per tier plan and want to create a new tier plan if the maximum is exceeded. Once the tier plans are identified, the learning phase may stop or may continue to monitor for changes. The choice of how many subscribers per tier plan, the number of tier plans are operator specific and based on engineering judgment. For example, an operator may choose to have between, for example, 5 to 15 Tier plans. Another operator may choose to have between, 5 to 20 Tier plans. It is likely that a higher number, for example, 40 Tier plans, may be intuitively too complex to manage.

At 315, the system is configured to determine the tier plan for at least a subset of or, in some cases, each subscriber of the plurality of network subscribers. Each subscriber will have a tier plan. By monitoring the maximum value each day, the system can determine if the subscriber matches the criteria, for example the throughput of any of the identified tier plans: Q, R, S, W, X, Y. For each subscriber, the system is configured to monitor the subscriber's behavior over a predetermined time (for example, a day, week, month or the like) and determine which tier plan that the subscriber would seem to be best assigned to. It is intended, that by the system monitoring the maximum throughput reached by the subscriber, the system will be able to determine which of the identified tier plans is associated with the subscriber or best associated with the subscriber. In some cases, the system may focus first on subscribers that are using/invoking applications that require high bandwidth as they may be the ones needing to adjust their tier plan. It will be understood that an operator's network will have a plurality of subscribers and the system may monitor the traffic flow of one or more subscribers of the plurality of subscribers.

The duration of time to decide the recommended tier plan for a given subscriber may take several days or longer depending on how active the subscriber is in using data. The amount of time can be pre-set by the operator or a threshold can be put in place that indicates that sufficient data has been accumulated to understand the subscriber's usage. In some cases, a subscriber may be sending data at throughput levels that fall in between tier plans. In this case, the upper value can be taken as the candidate tier plan.

The analysis module is configured to determine the recommended tier plan of each subscriber of the plurality of subscribers. In some cases, the analysis module may create a table with the subscriber and the subscribers respectively identified tier Plan. In a specific example, a subscriber 'John' may have a Tier plan W.

At 320, the analysis module is configured to determine if a given subscriber is self-congested. If the subscriber has reached the limit of their respective tier plan, for example, John has hit the limit of Tier plan 'W' more than a predetermined self-congestion threshold for the day, then the subscriber can be declared to be self-congested. In some cases, the given subscriber may be self-congested if the subscriber reaches a maximum throughput limit more often than a predetermined self-congestion threshold for a predetermined period of time. In some cases, the threshold may be 10% of the day. In other cases, the threshold may be configured by the network operator or may be amended as determined by the system or the operator. The predetermined self-congestion threshold of the day may be set by the operator to decide how frequently the subscriber needs to hit their maximum throughput (downlink or uplink) limit to declare them to be self-congested.

An alternatively way to decide the predetermined self-congestion threshold may be to monitor the subscriber QoE. If the subscriber QoE measured by any metric such as Round Trip Time, a proprietary QoE score, or the like, degrades significantly after more than a predetermined percentage of the day, then the subscriber can be declared to be self-congested. In some cases, the predetermined percentage may be set as 15% or 18% or other appropriate percentage.

The subscriber QoE may be considered a compound metric that is a weighted sum of scores across all the various applications. The weights depend on the importance of the application QoE to the operator. In another embodiment, it may be a more complex function of the various application QoE metrics.

A higher Tier Plan may be suggested if the user is reaching Bandwidth limits and has a poor QoE that are not attributable to other factors such as, for example, in-home WiFi issues, link degradation issues or the like.

At 325, the notification module is configured to upgrade the self-congested subscriber to the next higher tier plan. In some cases, depending on the subscription of the subscriber, the system may upgrade the subscriber atomically. In other cases, the notification module may notify the subscriber and/or the network operator of the potential for improved QoE with an upgrade. The monitoring module may continue to observe the subscriber and determine whether there has been the improvement in the QoE score.

If the subscriber is self-congested, the subscriber may be a candidate to be upgraded to the next tier plan and their QoE may then be continually monitored to see if it has improved. Also, the subscriber may be monitored to see if the throughput consumption is hitting the maximum for the next higher tier plan.

Figure 11:
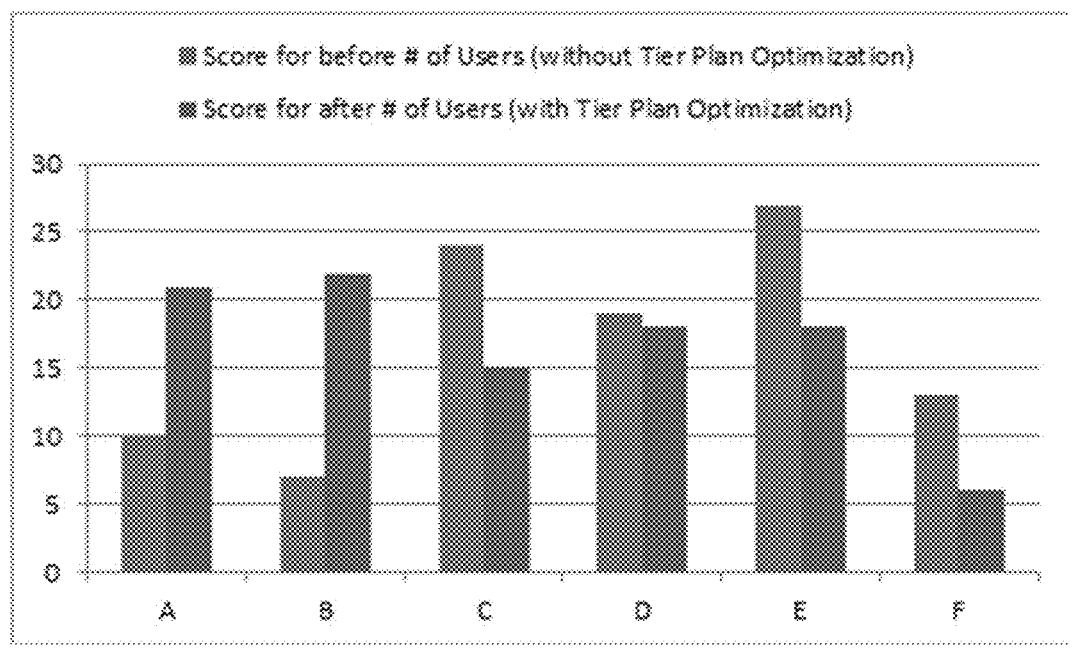
FIG. 11 is a graph shown before and after subscriber distribution for another example.

In a specific example, if score is calibrated as A through F, with A being the best and F being the worst, then the outcome of the system and method is intended to improve score distribution towards A. This result is illustrated in FIG. 11, for an example with a total number of 100 subscribers.

When the subscriber QoE falls below a predetermined QOE threshold, the tier plan for the subscriber may be changed for a trial duration, the length of which may be configured by operator. The plan may be changed back to the original plan if the QoE improvements are not observable which is intended to help optimize the cost of the plan to the subscriber. Poor QoE scores would suggest other issues such as poor WiFi placement in the home, old CPE device, or the like. An upgrade to the subscriber's tier plan is unlikely to resolve other issues.

It will be understood that the system is configured to continue to determine the subscriber's tier plan and determine if the subscriber is self-congested at predetermined intervals, for example on a daily, weekly, monthly or other basis. Continuous iteration and monitoring of the subscribers throughput and/or QoE is intended to provide for improved or optimal assignment of tier plan for the subscriber.

It will be understood that throughput/downlink and uplink speed is not always directly related to a maximum download limit that may be set based on Tiers. Both throughput and download limits can be controlled by operators in various different ways in order to determine the subscriber Tiers.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for subscriber tier plan adjustment, the method comprising:
    monitoring traffic flow for one or more subscribers of a plurality of subscribers on an operator's computer network;
    determining an uplink and a downlink bandwidth requirement for each of the one or more subscribers, wherein the uplink and the downlink bandwidth requirement is determined by monitoring uplink traffic flow separately from downlink traffic flow for each of the one or more subscribers;
    determining a recommended tier plan for each of the one or more subscribers based on the one or more subscribers' uplink and downlink bandwidth requirements, wherein determining the recommended tier plan comprises:
        determining a highest throughput for each of the one or more subscribers over a predetermined time interval;
        determining a recommended tier plan based on the highest throughputs for each of the one or more subscribers; and
        developing a set of recommended tier plans, wherein for a tier plan to be included within the set of recommended tier plans, the number of subscribers that send traffic up to a highest value must exceed a predefined subscriber number threshold; and
    providing the recommended tier plan for each of the one or more subscribers to a network operator.

2. The method according to claim 1, wherein determining the recommended tier plan for each of the one or more subscribers comprises determining whether the subscriber is self-congested in the subscribers current tier plan.

3. The method according to claim 2 wherein a subscriber is self-congested if the subscriber reaches a maximum throughput limit more often than a predetermined self-congestion threshold for a predetermined period of time.

4. The method according to claim 2 wherein a subscriber is self-congested if a QoE metric associated with the subscriber degrades significantly more than a predetermined percentage for a predetermined period of time.

5. The method according to claim 2, wherein a subscriber is self-congested if the subscriber has hit a tier plan rate on an uplink.

6. The method according to claim 5, wherein it is determined if the subscriber has hit a tier plan rate on the uplink based on background traffic from the subscriber.

7. The method according to claim 5, wherein the subscriber is self-congested when the network has available bandwidth.

8. The method according to claim 1 further comprising automatically notifying at least one of the one or more subscribers of the recommended tier plan and allowing the at least one of the one or more subscribers to automatically upgrade their tier plan.

9. A system for subscriber tier plan adjustment, the system comprising:
    at least one processor connected to a memory storing instructions executable by the at least one processor to implement:
        a learning module configured to monitor traffic flow for one or more subscribers of a plurality of subscribers on a computer network and determine an uplink and a downlink bandwidth requirement of each of the one or more subscribers, wherein the uplink and the downlink bandwidth requirement is determined by monitoring uplink traffic flow separately from downlink traffic flow for each of the one or more subscribers;
        an analysis module configured to determine a recommended tier plan for each of the one or more subscribers based on each subscriber's uplink and downlink bandwidth requirement, wherein determining the recommended tier plan comprises:
            determining a highest throughput for each of the one or more subscribers over a predetermined time interval;
            determining a recommended tier plan based on the highest throughputs for each of the one or more subscribers; and
            developing a set of recommended tier plans, wherein for a tier plan to be included within the set of recommended tier plans, the number of subscribers that send traffic up to a highest value must exceed a predefined subscriber number threshold; and a notification module configured to provide the recommended tier plan for each subscriber to a network operator.

10. The system according to claim 9, wherein the analysis module is further configured to determine whether the one or more subscribers is self-congested in the subscriber's current tier plan.

11. The system according to claim 10, wherein a subscriber is self-congested if the subscriber reaches a maximum throughput limit more often than a predetermined self-congestion threshold for a predetermined period of time.

12. The system according to claim 10, wherein a subscriber is self-congested if a QoE metric associated with the subscriber degrades significantly more than a predetermined percentage for a predetermined period of time.

13. The system according to claim 9, wherein the notification module is further configured to automatically notify at least one of the one or more subscribers of the recommended tier plan and allow the at least one of the one or more subscribers to automatically upgrade their tier plan.

\* \* \* \* \*